United States Patent [19]

Carpenter et al.

[11] Patent Number: 4,533,836

[45] Date of Patent: Aug. 6, 1985

[54] MULTIPLE VOLTAGE SWITCHING POWER SUPPLY HAVING OUTPUT VOLTAGE LIMITING

[75] Inventors: Ralph F. Carpenter, King County; David R. Gordon, Snohomish County, both of Wash.

[73] Assignee: Pacific Electro Dynamics, Inc., Redmond, Wash.

[21] Appl. No.: 457,408

[22] Filed: Jan. 12, 1983

[51] Int. Cl.³ .................................... H02P 13/22
[52] U.S. Cl. .................................. 307/11; 363/17; 363/49; 363/56; 363/71
[58] Field of Search .............. 363/17, 49, 56, 71, 363/98; 307/11, 31, 33, 34

[56] References Cited

U.S. PATENT DOCUMENTS

| | | | |
|---|---|---|---|
| 3,378,751 | 4/1968 | Walker | 363/58 |
| 3,614,590 | 10/1971 | Kernick | 363/71 |
| 3,942,093 | 3/1976 | Lowther | 307/11 |
| 4,150,425 | 4/1979 | Frosh et al. | 363/56 |

FOREIGN PATENT DOCUMENTS

| | | | |
|---|---|---|---|
| 99922 | 8/1979 | Japan | 363/17 |
| 628594 | 9/1978 | U.S.S.R. | 363/17 |

*Primary Examiner*—William H. Beha, Jr.
*Attorney, Agent, or Firm*—Seed and Berry

[57] ABSTRACT

A multi-voltage switching power supply having a first pair of switches connected in series with each other across a pair of incoming power lines. The switches are alternately closed at a fifty percent duty cycle. A plurality of pairs of series-connected switches are also connected between the incoming power lines and operated in a pulse-width modulated mode. Power supply circuits are connected between the junction of the pulse-width modulated switches of each pair and the junction of the fifty percent duty cycle switches. The peak value of the current applied to the power supply circuit, which determines the power supply output voltage, is controlled by adjusting the closure time of the pulse-width modulated switches.

13 Claims, 3 Drawing Figures

MULTIPLE VOLTAGE SWITCHING POWER SUPPLY HAVING OUTPUT VOLTAGE LIMITING

TECHNICAL FIELD

This invention relates to switching power supplies, and more particularly, to a switching power supply which generates multiple DC voltages from a direct current supply voltage.

BACKGROUND ART

Regulated power supplies are universally used with electronic equipment for supplying DC power to such equipment at a voltage that is constant despite variations in load impedance and input power voltage. A regulated power supply senses the output voltage applied to the equipment and changes the operation of the power supply circuit in some manner to maintain the output voltage constant. Analog regulator circuits for power supplies are usually either the shunt or series variety. In the shunt variety, the impedance of a resistive element shunting the load is varied to maintain the voltage applied to the load substantially constant. In a series regulator circuit, a resistive element is placed in series with the load and the impedance of the element varies to maintain the output voltage constant. Both the series regulation approach and the shunt regulation approach are highly inefficient because they waste a great deal of power in the resistive shunt or series element.

As a result of the inefficiency of analog power supplies, switching power supply circuits have been devised which sequentially connect and disconnect the input line to the output, with the duty cycle or percentage of on-time being adjusted to maintain the output voltage substantially constant. The principle advantage of the switching power supply is that the solid-state switching elements connecting and disconnecting the load to the input are not operated in their linear region but instead operate at a low-voltage saturation point or a zero current cutoff point. Either of these points results in relatively little or no power dissipation in the switching element.

One commonly used switching power supply utilizes an "H-shaped" configuration in which two series-connected pairs of solid-state switches are arranged in parallel between two supply lines. The load is then connected to the interconnection between the switches of each leg, and the switches are operated in synchronism with each other so that the upper switch of one leg is closed while the lower switch of the other leg is closed. In this manner, current can be made to flow through the load in opposite directions even though the power supply is connected to a DC power source. The load receiving the AC signal can be a transformer in order to increase the supply voltage as desired. The signal from the transformer is then rectified and applied to a low-pass filter. The output voltage of the switching power supply can then be regulated by controlling the duty cycle of the solid-state switches.

Although the above-described switching power supply circuit has proved highly advantageous, primarily because of its high efficiency, it is apparent that a power supply requiring a large number of DC voltages of varying magnitude would result in a proliferation of circuitry utilizing the switching circuitry described above. Thus, there is a need to redundantly utilize the circuit elements of such power supplies wherever possible.

Another problem associated with switching power supplies arises from the internal capacitance inherent in solid-state switches. This capacitance allows current to flow through the switch even when the switch remains open. When the power supply is driving a load, this capacitive current flow does not present a problem because the duty cycles of the switches are automatically reduced to compensate for this current flow and thus maintain the output voltage constant. However, under no-load conditions, the capacitive current flow can increase the output voltage above the desired value. The duty cycle control circuitry for the switches cannot prevent this uncontrolled rise in output voltage since the switches are already open at all times, thus making further reductions in the duty cycle impossible.

Still another problem encountered with constant frequency, pulse-width modulated switching power supplies is their instability at duty cycles in excess of fifty percent.

DISCLOSURE OF INVENTION

It is an object of the invention to provide a switching power supply which, instead of utilizing separate circuits for each output voltage, utilizes much of the same circuitry generating several output voltages.

It is another object of the invention to provide a multiple voltage switching power supply which senses a no-load condition and alters the operation of the circuit in response thereto in order to prevent uncontrolled increases in the output voltage under no-load conditions.

It is still another object of the invention to provide a switching power supply which is stable for switching duty cycles in excess of fifty percent.

These and other objects of the invention are provided by a switching power supply of H-shaped configuration. However, instead of utilizing merely two switching branches, each containing two series-connected, solid-state switches to generate one output voltage, the power supply circuit utilizes N such branches to generate $N-1$ voltages. One of the branches is operated at fifty percent duty cycle, with one switch in the branch being on while the other switch is off. The remaining branches operate in a pulse-width modulated mode to control the current flowing through a load connected from the center of that branch to the fifty percent duty cycle branch. The pulse-width modulation of each branch is synchronized to the operation of the fifty percent duty cycle branch so that current flows through each load in one direction during the first half cycle and in the opposite direction during the remaining half cycle. Each load is the primary of a transformer having its secondary connected to a rectifier and low-pass filter, thereby generating respective DC output voltages. Each output voltage is sensed and compared to a reference, with the difference therebetween used to control the pulse-width modulation of the respective switching branch. Thus, $N-1$ voltages can be generated from N switching branches instead of using two switching branches to generate each output voltage in a conventional manner. The current flowing through each switching branch is sensed, and, under no-load conditions, the operation of the solid-state, pulse-width modulated switches in each branch changes so that they are operated in phase with the fifty percent duty cycle switches. As a result, voltage applied to the load by the pulse-width modulated branch is equal to the voltage applied to the load by the fifty percent duty cycle branch, thereby making the voltage across the load, zero.

BEST MODE FOR CARRYING OUT THE INVENTION

Figure 1:
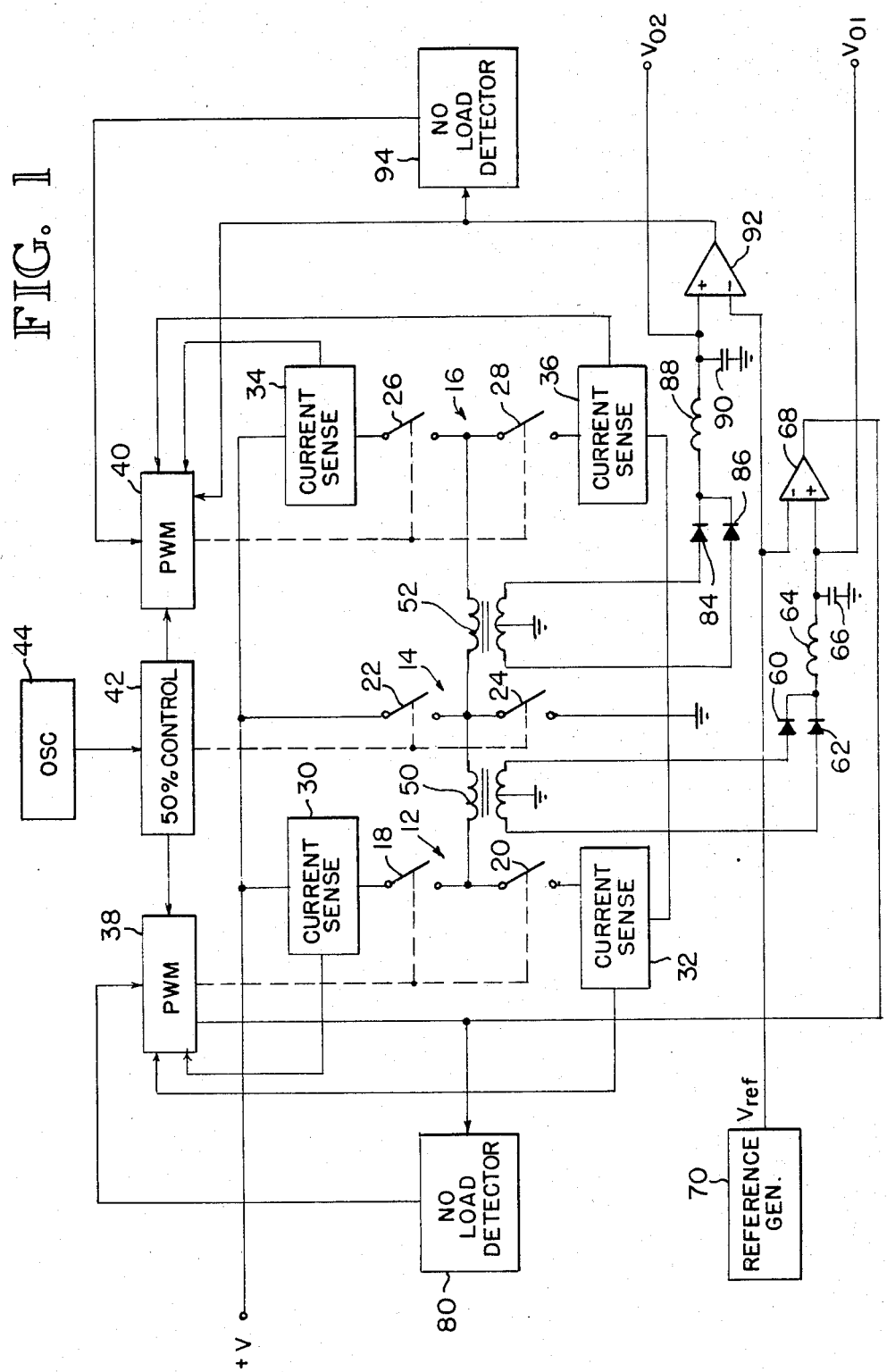
FIG. 1 is a block diagram of the multiple voltage switching power supply.

A block diagram illustrating the principle of the inventive switching power supply is illustrated in FIG. 1. The power supply capable of generating two separately regulated, DC output voltages from a DC input voltage applied between the V+ input and ground. Connected between the V+ input and ground are three branches 12,14,16, each of which includes two solid-state switches 18–28, respectively. The branches 12,16 also include current sensors 30,32,34,36 for measuring the current flowing through the solid-state switches 18,20,26,28, respectively. The switches 18,20 and 26,28 are operated by respective pulse-width modulation circuits 38,40. The switches 22,24 are operated by a fifty percent duty cycle control circuit 42. The time base for all of these circuits 38–42 is an oscillator 44.

A load in the form of a transformer 50 is connected between the midpoint of branch 12 and the midpoint of branch 14. Similarly, a second transformer 52 is connected between the midpoint of branch 16 and the midpoint of branch 14. It can be seen that closure of switches 18 and 24 allows current to flow from the V+ line through current sensor 30, switch 18, the primary of transformer 50 and switch 24 to ground. Closure of switches 20 and 22 allows current to flow from the V+ line to ground through the primary of transformer 50 in the opposite direction and through the current sensor 32. Closure of diagonally opposite switches 18,24 and 20,22 thus allows alternating current to flow through the transformer 50. This AC signal is rectified by diodes 60,62 and filtered by a low-pass filter consisting of inductor 64 and capacitor 66 to generate an output voltage $V_{01}$. The output voltage $V_{01}$ is also compared by amplifier 68 to a reference signal $V_{ref}$ generated by slow-start circuit 70. The output of the amplifier 68 is thus proportional to the deviation of output voltage $V_{01}$ from the reference voltage $V_{ref}$. The pulse-width modulator 38 is controlled by the voltage from amplifier 68 to increase the duty cycle of switches 18,20 if the output voltage $V_{01}$ falls below the reference voltage $V_{ref}$ and to decrease the closure time of switches 18,20 if the output voltage $V_{01}$ rises above the reference voltage $V_{ref}$.

Conventional switching power supplies have heretofore operated the switches 18,24 and 20,22 in synchronism with each other in a pulse-width modulation mode. However, since either of the switches 18,20 in branch 12 is capable of terminating flow through the transformer 50, the circuit can function with only the switches 18,20 in branch 12 pulse-width modulated and the switches 22,24 in branch 14 alternately operating at a fifty percent duty cycle. Thus, switch 24 is closed for fifty percent of the time, and switch 18 is closed for a portion of that time, depending upon the magnitude of the signal from amplifier 68. Similarly, switch 22 is closed for the remaining fifty percent of the time, and switch 20 is closed for a portion of that time, depending upon the magnitude of the signal from amplifier 68.

Conventional multiple-voltage power supplies have invariably utilized two switching branches having a load connected to their midpoints for each output voltage. As a result, N separate output voltages require 2N branches. However, it can be seen that since the switches 22,24 in branch 14 continuously operate at fifty percent duty cycle, regardless of the output voltage or any other operating parameter, additional loads, such as transformer 52, can be connected between the midpoint of switching branch 14 and other branches, such as 16. Thus, N separate output voltages can be generated utilizing only N+1 switching branches, thus yielding a savings of N+1 switching branches and associated circuitry.

The solid-state switches 18–28 are conventional solid-state devices, such as, for example, metal oxide silicon, field effect transistors (MOSFETs). Such switches inherently have a shunt capacitive reactance across their source and drain terminals which reduces the impedance of the switches at high frequencies, even when the switches are open. Thus, when switch 22 closes, the voltage applied to switch 20 rises to the voltage on the V+ line and the high-frequency components of this transient cause current to flow through the switch 20 even when the switch 20 is open. For relatively small loads (i.e., when substantial current is being drawn from transformer 50), the effect of this capacitive coupling is negligible. However, under no-load conditions, this capacitive coupling can cause the output voltage to exceed the reference level, even though the switches 18,20 never close. Accordingly, under high output voltage conditions, a no-load detector 80 receiving the output of amplifier 68 causes the pulse-width modulation control circuit 38 to operate the switches 18,20 in synchronism with the switches 22,24. Thus, under no-load conditions, switch 18 closes at the same time as switch 22, and, at that same time, switches 20 and 24 open, thus pulling each side of the transformer 50 to V+. At that time, any capacitive coupling across switch 20 is equalized by the capacitive coupling across switch 24. During the next half-cycle, switches 18,22 open and switches 20,24 close, thereby pulling both sides of the transformer 50 to ground. As a result, no current flows through the transformer 50 in the no-load condition, so it is impossible for the output voltage $V_{01}$ to rise above the reference voltage $V_{ref}$. Thereafter, when current is drawn from the power supply, causing the output voltage $V_{01}$ to decrease slightly, the circuit shifts to its normal operating mode, in which diagonally connected switches 18,24 and 20,22 operate in synchronism with each other.

The circuitry connected to the transformer 52 operates in the same manner as the circuitry connected to the transformer 50. Thus, diodes 84,86 rectify the AC signal generated by transformer 52, and the rectified output is applied to a low-pass filter consisting of conductor 88 and capacitor 90. The resulting DC output $V_{02}$ is compared by amplifier 92 to the voltage reference from slow-start circuit 70 to operate the pulse-width modulation control circuit 40 and a no-load detector 94 for causing the switches 26,28 to operate in synchronism with the switches 22,24 under no-load conditions.

The slow-start circuitry 70, as explained in greater detail hereinafter, generates a voltage reference $V_{ref}$ which gradually increases from zero upon power-up of the system. The voltage reference is also reset to zero in the event that insufficient voltage exists to adequately turn on the solid-state switches 18–28 or in the event that excessive current is drawn from the power supply.

Figure 2:
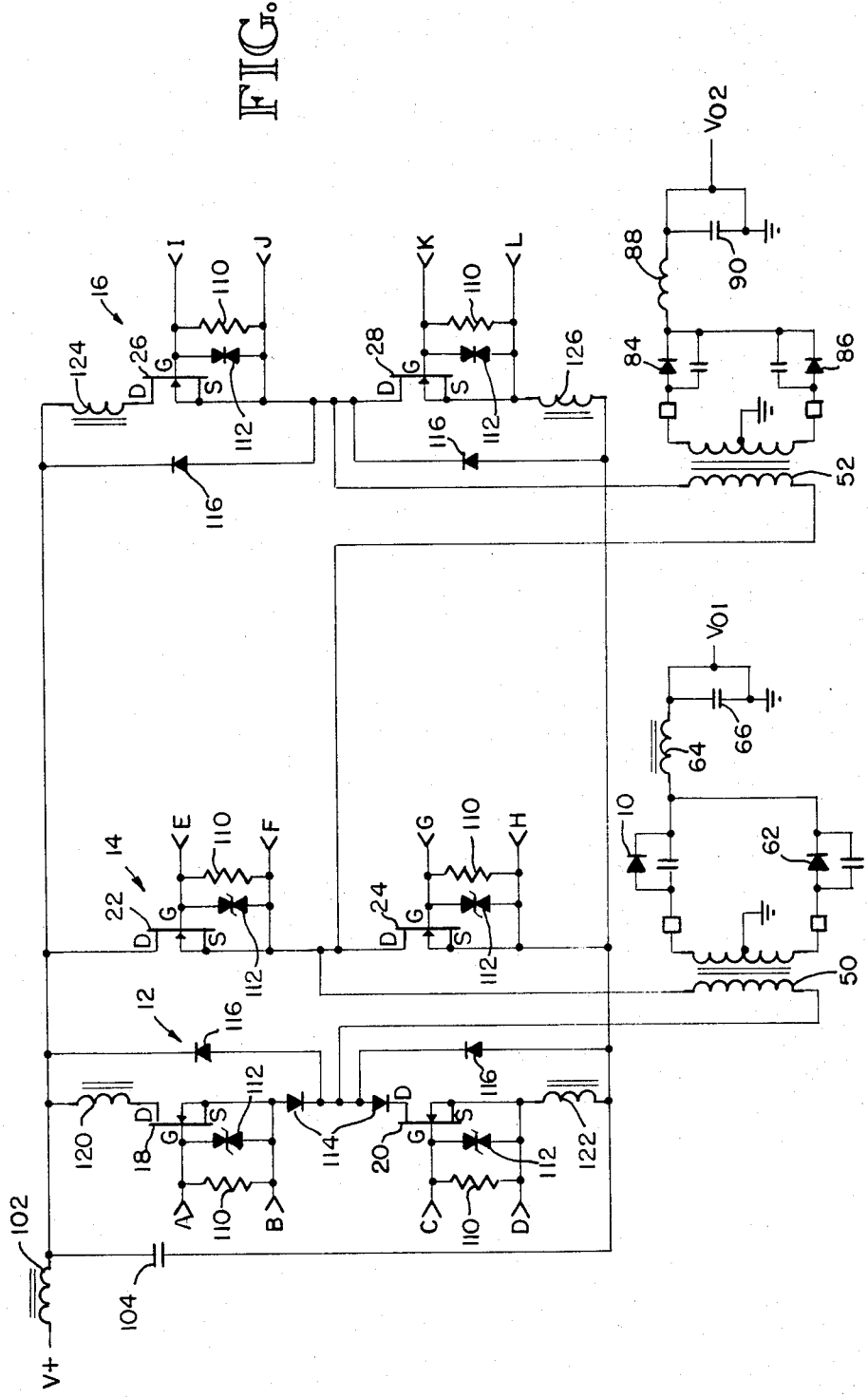
FIG. 2 is a schematic of one portion of the power supply showing the branches of solid-state switches.

With reference now to FIG. 2, DC input power is applied to the power supply circuit through a low-pass, electromagnetic interference filter consisting of inductor 102 and capacitor 104. Each branch 12,14,16 includes two semiconductor switches in the form of metal oxide silicon, field effect transistors (MOSFETs) 18,20,22, 24,26,28. Each MOSFET 18–26 is operated by a control voltage applied between the gate and source, with the MOSFETs 18–26 becoming conductive for positive gate-to-source voltages and non-conducting for zero or negative gate-to-source voltages. Respective resistors 110 are connected between the gates and sources of the MOSFETs 18–26 to lower the gate-to-source impedance in order to reduce the effect of interelectrode capacitances inherent in the MOSFETs 18–28. A pair of back-to-back, series-connected zener diodes 112 are connected across respective resistors 110 to act as voltage snubbers for the MOSFETs 18–28 at the turn-on and turn-off by clipping transients generated by a transformer connected between the gate and source as current flow through the transformers terminates. Other diodes 114,116 provide current paths for the inductive discharge of transformers 50,52. Finally, the switches 18,20 and 26,28 in switching branches 12 and 16, respectively, are connected in series with the primaries of transformers 120,122,124,126, which measure the current flowing through the respective MOSFETs 18–28 to which they are connected. The transformers 120–126 thus function as part of the current sensors 30,32,34,36 illustrated in FIG. 1.

As explained above with reference to FIG. 1, the switching branch 14 operates in a fifty percent duty cycle mode in which MOSFET 22 receives a positive gate-to-source voltage to turn on FET 22 while MOSFET 24 receives a negative gate-to-source voltage, thereby cutting off MOSFET 24. The remaining fifty percent of the time, MOSFET 22 is cut off with a negative gate-to-source voltage while MOSFET 24 is turned on with a positive gate-to-source voltage. Switching branches 12 and 16 operate in a pulse-width modulation mode in which MOSFETs 18 and 26 turn on for only a portion of the time that MOSFET 24 is turned on and MOSFETs 20 and 28 turn on for only a portion of the time that MOSFET 22 is turned on. MOSFETs 18 and 20 are controlled by an entirely different circuit from MOSFETs 26,28 to produce two separately regulated output voltages, $V_0$ and $V_2$.

Figure 3:
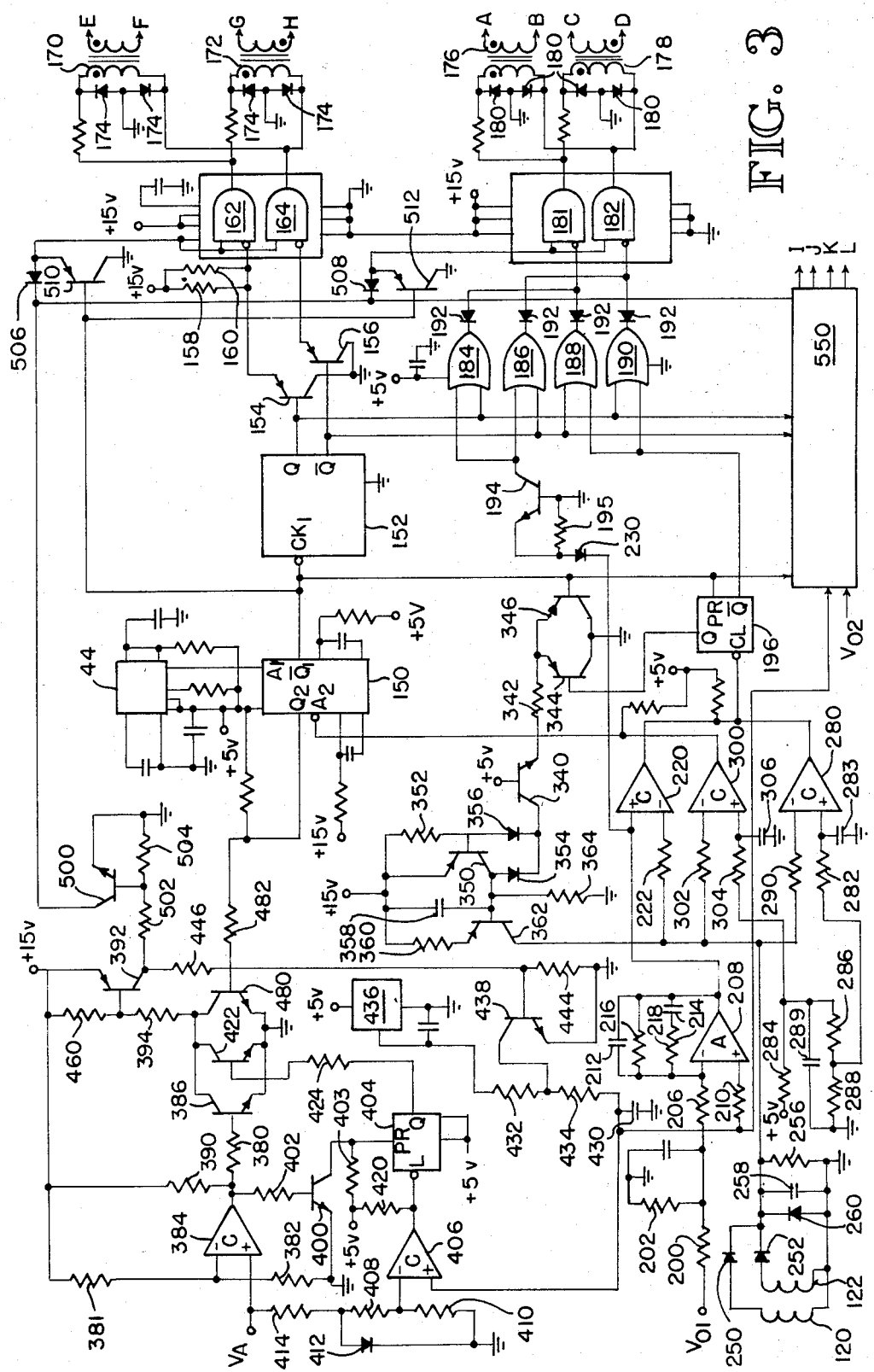
FIG. 3 is a schematic of line monitor and startup circuitry for the power supply and the circuitry for controlling the operation of the solid-state switches.

The circuitry for controlling the operation of the MOSFET switches 18–28 is illustrated in FIG. 3. As mentioned above with reference to FIG. 1, the time base for the power supply circuitry is generated by an oscillator 44. The output of the oscillator 44 is applied to one input A1 of a dual one-shot 150 which is triggered on the falling edge to generate a relatively short, negative-going pulse at its $\overline{Q}_1$ output. This negative-going pulse toggles a flip-flop 152. The Q and $\overline{Q}$ outputs of the flip-flop 152 are connected to the bases of respective emitter follower transistors 154,156. The emitters of transistors 154,156 are connected to respective pull-up resistors 158,160 and to inverting inputs of respective AND-gates 162,164. Assuming that the AND-gates 162,164 are enabled and flip-flop 152 is set, the output of AND-gate 162 is low and the output of AND-gate 164 is high, thereby causing current to flow through the primaries of transformers 170,172 in the reverse direction (i.e., from bottom to top). The current flowing through the transformer 172 (being reverse wound) generates a positive voltage across terminals G and H which turns on MOSFET 24 of the fifty percent duty cycle switching branch 14. The secondary of transformer 170 generates a negative voltage between terminals E and F which cuts off MOSFET 22 of branch 116. Upon receipt of the next clock pulse from one-shot 50, flip-flop 152 is reset, thereby generating a high at the output of AND-gate 162 and a low at the output of AND-gate 164. Current then flows through the primaries of transformers 170,172 in the forward direction, thereby generating a positive voltage between terminals E and F to turn on MOSFET 22 and a negative voltage between terminals G and H to turn off MOSFET 24. Diodes 174 are connected from the terminals of the primary of transformers 170,172 to ground to damp transients generated by the transformers 170,172 when flow through the transformers 170,172 abruptly terminates.

The pulse-width modulated switches 18,20,26,28 are controlled by respective transformers, two of which, 176,178, are illustrated in FIG. 3. Like the transformers 170,172, clamping diodes 180 are connected from the terminals of the primary to ground to damp transients generated by abrupt changes of the current through the transformers 176, 178. The transformers 176,178 are connected in parallel with each other to a pair of AND-gate drivers 181,182. However, the secondary of transformer 178 is connected to its respective MOSFET switch 20 in the opposite manner that the secondary of transformer 176 is connected to its respective MOSFET switch 18. Thus, although current flows through the primaries of transformers 176,178 in the same direction at all times, only one MOSFET switch 18,20 is on at any time.

Assuming that the AND-gate drivers 181,182 are enabled, they are controlled by OR-gates 184–190 through respective diodes 192. The OR-gates 184–190 are enabled by the outputs of flip-flop 152 so that only two of the OR-gates 184,190 or 186,188 are enabled at any one time. Thus, when the flip-flop 152 is reset, OR-gates 184 and 190 are enabled. At all other times, OR-gates 186,188 are enabled. Under normal conditions (i.e., when not under no-load conditions), transistor 194 is held at cutoff by resistor 195 so that its collector is floating, as explained in greater detail hereinafter, thereby disabling OR-gates 184,186. Thus, under normal operating conditions, OR-gates 188 and 190 control the operation of respective AND-gate drivers 181,182. OR-gates 188,190 are, in turn, controlled by the $\overline{Q}$ output of flip-flop 196. As explained in greater detail hereinafter, flip-flop 196 is preset at the 0° and 180° points of each cycle when the switches 22,24 of the fifty percent duty cycle branch 14 change state. At this time, either OR-gate 188 or OR-gate 190 is enabled by flip-flop 152, and the enabled OR-gate 188 or 190 then outputs a low for the period of time that the flip-flop 196 is preset. The low at the output of enabled OR-gate 188,190 causes its respective AND-gate driver 181,182 to generate a high, thereby causing current to flow through the transformers 176,178 in either direction. A low at the output of AND-gate 188 causes transformer 176 to generate a positive voltage, thereby turning on MOSFET 18. At the same time, transformer 178 generates a negative voltage, thereby cutting off MOSFET 20. During this time, a high applied to AND-gate driver 182 by disabled OR-gate 190 causes AND-gate driver 182 to generate a low which serves as a sink for the current generated by AND-gate driver 181. During the next half-cycle, OR-gate 190 is enabled, thereby causing transformer 178 to generate a positive voltage and transformer 176 to generate a negative voltage. The flip-flop 196 is preset for a period determined by, among other things, the magnitude of the output voltage $V_{01}$. At the appropriate time, the flip-flop 196 is cleared, thereby disabling OR-gates 188,190 until flip-flop 152 once again changes state at the 0° or 180° points of the cycle, when the fifty percent duty cycle switches 22,24 change state.

The circuitry for clearing the flip-flop 196 to control the duty cycle of the pulse-width modulation of the switches 18,20,26,28 utilizes as inputs signals indicative of the output voltage $V_{01}$ and current through the switches 18,20,26,28.

The voltage across the load $V_{01}$ is applied to a low-pass filter composed of resistors 200,202 and capacitor 204 before being applied through resistor 206 to amplifier 208. Amplifier 208 also receives a reference voltage $V_{ref}$ (generated as explained hereinafter) through resistor 210. Capacitors 212,214 and resistors 216,218 are connected in the feedback loop of amplifier 208 to control its gain and roll off the gain at appropriate frequencies. Thus, the output of amplifier 208 is inversely proportional to the power supply output voltage $V_{01}$ with respect to the voltage reference $V_{ref}$. A comparator 220 receives the output of amplifier 208 and it compares it to a current feedback signal applied to the comparator 220 through resistor 222. The output of comparator 220 thus goes negative when the current signal exceeds the level of output of amplifier 208.

As explained above with reference to FIG. 1, an increase in the output voltage $V_{01}$ above the voltage reference $V_{ref}$ causes a reduction in the on-time of switches 18,20. However, because of the capacitance across the terminals of MOSFET switches 18,20, current flows through the transformer 50 even when the switches 18,20 never close since the 50% switches 22,24 keep running. Under such no-load conditions, the output voltage will increase significantly beyond the reference voltage $V_{ref}$ and there is no way to reduce the output voltage since the closure time of the switches 18,20 has already been reduced to zero. Under these circumstances, the output of amplifier 208 goes sufficiently low to forward bias the base-emitter junction of transistor 194 through diode 230. The normally floating collector of transistor 194 is then pulled low, thereby enabling OR-gates 184 and 186. It will be remembered that OR-gates 184,190 are enabled by the flip-flop 152, which is used to control the switches 22,24 in the fifty percent duty cycle branch 14. Thus, when OR-gates 184,186 are enabled by a low from transistor 194, OR-gates 184,186 operate in synchronism with transistors 154,156. Assuming that AND-gate drivers 181,182 are enabled, OR-gates 184,186 then operate AND-gate drivers 181,182 in synchronism with AND-gate drivers 162,164. Thus, the secondary of transformer 176 outputs a voltage that is identical to the voltage output by the secondary of transformer 170. Likewise, transformer 178 outputs a voltage that is identical to the voltage output by transformer 172. Thus, under no-load conditions, pulse-width modulated switch 18 operates in synchronism with fifty percent duty cycle switch 22, and pulse-width modulated switch 20 operates in synchronism with fifty percent duty cycle switch 24. The voltage on one side of the transformer 50 is then always equal to the voltage on the other terminal of transformer 50, thereby preventing any current from flowing through the transistor 50 and allowing the output voltage $V_{01}$ to return to the reference voltage $V_{ref}$. It is important to note that the operation of the AND-gate drivers 181,182 under no-load conditions is the reverse of their operation under normal conditions. Under no-load conditions, AND-gate driver 181 turns on its respective switch 18 at the same time that AND-gate driver 164 turns on its respective switch 24. This is because the OR-gate 188 controlling AND-gate driver 181 receives the same low as the transistor 156 controlling AND-gate driver 164. However, under no-load conditions, AND-gate driver 164 turns on at the same time as AND-gate driver 182.

The comparator 220, to which the output of amplifier 208 is also applied, also receives a signal through resistor 222 that is proportional to the current through the pulse-width modulated branch 12. Accordingly, the secondaries of respective transformers 120,122 are connected to each other through respective diodes 250,252. Insofar as only one switch 18 or 20 in the pulse-width modulated branch 12 is closed at a time, current flows through only one transformer 120 or 122 at a time. The current from the active transformer 120 or 122 flows through its respective diode 250,252 and through a current-sensing resistor 256. The voltage across resistor 256 is thus indicative of the current flowing through the closed switch 18 or 20. Capacitor 258 provides low-pass filtering of this signal and clamping diode 260 prevents negative voltages from being generated across resistor 256 when current through the transformers 120,122 abruptly terminates.

The voltages applied across transformers 50,52 (FIGS. 1 and 2) are essentially voltage steps. Because of the inductance 64 and 88 driven by transformers 50,52, respectively, the current through the transformer 50, sensed by transformers 120,122, is essentially a linearly increasing "ramp" function. This linearly increasing current wave form is applied through resistor 222 to the comparator 220. The output of the comparator 220 (assuming a normal output voltage $V_{01}$) is initially positive. However, as the current through the transformer 50 increases and the voltage across resistor 256 increases in proportion thereto, the output of comparator 220 goes low when the voltage across resistor 256 exceeds the voltage out of amplifier 208, thereby resetting the flip-flop 196. As explained above, when flip-flop 196 resets, OR-gates 188,190 are disabled, thereby opening the pulse-width modulated switches 18,22. It is thus seen that the pulse-width modulation control circuit constitutes a negative feedback control loop because an increase in the output voltage $V_{01}$ above the reference voltage $V_{ref}$ causes amplifier 208 to apply a smaller voltage to comparator 220. The voltage indicative of current across resistor 256 then reaches this reduced voltage from amplifier 208 at an earlier time so that comparator 220 resets the flip-flop 196 earlier. As a result, the on-times of the switches 18,20 are reduced, thereby decreasing the average current through the transformer 50 and returning the output voltage $V_{01}$ toward the output voltage $V_{ref}$. Similarly, a decrease in the output voltage $V_{01}$, caused, for example, by an increase in the load, increases the voltage at the output of the amplifier 208. It thereafter requires more time for the current-indicative voltage across resistor 256 to reach this increased voltage so that the flip-flop 196 remains set for a longer period, thereby increasing the average current through the transformer 50.

The flip-flop 196 is also cleared by the output of comparator 280. Comparator 280 receives, through resistor 282, a reference voltage from a chain of voltage divider resistors 284–288 and filter capacitors 183,189. The current-indicative voltage across resistor 256 is applied to the comparator 280 through resistor 290. In the event that the current through switch 18 or 20 exceeds the level set by the voltage across resistor 288, flip-flop 196 is reset to open the switches 18,20 even though the output voltage is still below the reference voltage $V_{ref}$. This portion of the circuitry thus prevents excessive currents from flowing through the switches 18,20 in the event of excessive loads on the power supply, such as might result from a short-circuited output.

The current-indicative voltage across resistor 256 is also applied to a third comparator 300 through resistor 302. The other input of comparator 300 receives a reference voltage through resistor 304 which is larger than the reference voltage applied to comparator 280. Capacitor 306, along with resistor 304, forms a low-pass filter to prevent rapid fluctuations of the reference. Insofar as the reference voltage applied to comparator 300 is substantially greater than the reference voltage applied to comparator 280, the output of comparator 300 does not go low until a current is flowing through one of the switches 18 or 20 that is significantly greater than the current which causes the output of comparator 280 to go low. In the event that this substantially greater current is flowing through one of the switches 18 or 20, the low at the output of comparator 300 triggers the second part of one-shot 50 to disable the power supply circuitry, as explained in greater detail hereinafter, i.e., the comparator 208 would fire if there was a dead short on the output clamping the flyback voltage on the output inductors 64,88 to 0.7 volt, and if the voltage-time product during the inductor charge portion exceeded the flyback voltage-time product. This would happen because the output inductors 64,88 would start to saturate and the current in the PWM switch (18 or 20) would rise faster than normal. Because of propagation delays, comparator 300 would be activated before the PWM switch 18 or 20 could turn off.

As mentioned above, it can be demonstrated that the stability of the power supply circuit in response to load current transients is adversely affected when the duty cycle of the pulse-width modulated switches 18,20 are in excess of fifty percent. Basically, if the output current suddenly increases, the voltage across resistor 256 reaches the voltage at the output of amplifier 208 sooner, thereby clearing flip-flop 196 earlier. Thus, instead of causing a larger on-time for the switches 18,20, the increase in current decreases the on-time. Insofar as the frequency of operation of the circuit is constant, the shorter on-time results in a longer off-time, which allows the current flowing through the output inductor 64 (FIG. 2) to decay longer. This instability problem is solved in the multifrequency switching power supply by generating an additional current ramp that is added to the current supplied to resistor 256 by the transformers 120,122. Accordingly, transistor 340 is turned on through resistor 342 whenever either transistor 344 or transistor 346 is turned on. Transistor 346 is normally turned off by a high at the $\overline{Q}_1$ output of one-shot 150. However, at the 0° and 180° points of the cycle, when the fifty percent duty cycle switches 22,24 are changing state, the negative-going pulse that toggles flip-flop 152 turns on transistor 346 for the duration of the pulse, thereby turning on transistor 340. Thereafter, and assuming that sufficient current is being drawn by the load so that pulse-width modulated switches 18, 20 are closed for at least some time, the Q output of flip-flop 196 turns off transistor 344, which is normally on. Thus, transistor 340 is "off" when switches 18,20 are "on," but it is turned "on" when both switches 18,20 are "off." When transistor 340 is in its "on" condition, current is drawn through the base-emitter junction of transistor 350 and resistor 352 through diodes 354 and 356, which serve as a "baker" clamp. As a result, transistor 350 turns on, thereby reducing the voltage across capacitor 358 to about one diode drop. This, in turn, places about zero volts across resistor 360 through the base-emitter junction of transistor 362. Under these circumstances, the collector current of transistor 362 is substantially zero, thereby resetting the current ramp that prevents fifty percent current oscillation. However, during the on-time of switches 18,20, when transistor 340 is turned off, transistor 350 is turned off by resistor 352, thereby allowing capacitor 358 to charge through resistor 364. As capacitor 358 charges, the voltage across resistor 360, and hence the collector current of transistor 362, increases. The voltage across capacitor 358 is allowed to build up to only a relatively small percentage of the available voltage so that the increase in the current supplied by the transistor 362 is fairly linear. In summary, then, transistor 362 supplies a linearly increasing current starting a short period after the turn-on time of switch 18 or 20 and ending when switch 18 or 20 turns off. This linearly increasing current ramp stabilizes the operation of the circuit in response to output current transients.

The conditions of various supply voltages in the power supply system are measured and the operation of the power supply is suspended for various irregularities, as mentioned above. The +15 volt circuit supply voltage is divided by voltage divider resistors 380,382 and applied to one input of a comparator 384. The other input of comparator 384 receives a reference voltage $V_A$ from an auxiliary power supply. Under normal operating conditions, the divided-down +15 supply voltage is greater than the reference voltage $V_A$, thereby causing the comparator 384 to output a low which holds transistor 386 "off" through resistor 388. In the event that the +15 circuit supply voltage falls below a predetermined value, the output of comparator 384 goes high, thereby allowing current flowing through resistor 390 to turn on transistor 386. As explained in greater detail hereinafter, turning on transistor 386 pulls the base of transistor 392 low through resistor 394 to reset the voltage reference $V_{ref}$ to zero and disable the switches 18–28 from further operation.

The high normally at the output of comparator 384 is also applied to the base of transistor 400 through resistor 402, thereby drawing current through pull-up resistor 403 to place flip-flop 404 in a preset condition. Flip-flop 404 outputs a high voltage as a result of being preset, which turns on transistor 422, thereby latching transistor 392 on until flip-flop 404 is reset. The "clear" input CL of flip-flop 404 receives the output of comparator 406. Comparator 406 compares the reference voltage $V_{ref}$ to a reference voltage generated between resistors 408,410. The reference voltage applied to the negative input of comparator 406 (approximately 0.35 V) is a portion of the voltage generated across diode 412, which receives current from the auxiliary power supply voltage $V_A$ through resistor 414. At "power up," the voltage reference $V_{ref}$ will normally be below the reference voltage generated between resistors 408, 410, thereby ensuring that the output of comparator 406 is low, which keeps flip-flop 404 cleared. Capacitor 430 starts charging up to its final value ($V_{ref}$=2.5 V). If, with the added circuit activity, the +15 V line is pulled down low enough to cause comparator 384 to change state, transistor 386 turns on, as will transistor 400. The result of this will be that, if $V_{ref}$ is greater than 0.35 V, flip-flop 404 will be set, turning on transistor 422 and latching transistor 392 on. Transistor 392, in turn, turns on transistor 500 to turn off the output drivers 162, 164, 181, and 182. Transistor 392 also turns on transistor 438, which starts to discharge capacitor 430. When the voltage on capacitor 430 falls below 0.35 V, comparator 406 recognizes this and clears flip-flop 404, which, in turn, turns off transistor 422, thereby releasing the latch on transistor 392. As long as the +15 V auxiliary line is high enough, transistor 386 will be off and transistor 392 will turn off. Transistor 500 will then also turn off, enabling the output drivers, and transistor 438 will turn off, thereby allowing capacitor 430 to again charge up, "slow starting" the power supply. If the +15 V line is sufficiently high, it cannot be pulled down enough to cause any more cycling. As can be seen, if the line monitor detects an under voltage on the internal power, it shuts down the main power supply until the slow start capacitor 430 is nearly all discharged before allowing a restart.

During this initial startup period, the switches 18–28 are disabled from operation by transistor 500, as mentioned above. The switches 18–28 are also disabled from operation when transistor 392 is turned on by transistor 480. Transistor 480 is operated through resistor 482 by the $Q_2$ output of one-shot 150. It will be remembered that the second portion of one-shot 150 is triggered by the output of comparator 300 when the current through the switches 18 or 20 exceeds the relatively high voltage reference generated across capacitor 289. This is, of course, an abnormal condition since significantly smaller currents would normally cause comparator 280 to open the switches 18,20 through flip-flop 196. Thus, in the event of this abnormally high current condition, transistor 480 also turns on transistor 392. Capacitor 430 is then discharged to reduce the reference voltage $V_{ref}$ to zero.

In addition to resetting the voltage reference $V_{ref}$ to zero, transistor 392 also disables the switches 18–20. Accordingly, turning on of transistor 392 applies current to transistor 500 through resistor 502. Transistor 500, which is normally held at cutoff through resistor 504, then disables AND-gate drivers 162,164 through diode 506. Similarly, AND-gate drivers 181,182, which operate switches 18,20, respectively, are also disabled through diode 508.

AND-gate drivers 162,164 are also disabled through transistor 510 by the negative-going pulse at the $\overline{Q}$ output of one-shot 150 at the start of the switching time of transistors 118–128. Similarly, AND-gate drivers 181,182 are disabled through transistor 512 at the start of the switch closure. The AND-gate drivers 162,164,181,182 are disabled for this short period at the beginning of each switch closure to allow one switch in a branch 12–16 to open before the other switch in that branch closes. This prevents two series-connected switches in a branch from being closed at the same time, which would apply a short circuit from the input voltage line to ground.

The above description explains the operation of the circuitry for controlling switches 18,20 in the switching branch 12. The circuitry for controlling the switches 26,28 in switching branch 16 (FIG. 1) is contained in block 550 and, insofar as it is identical to the above-described circuitry, is not explained in detail. Nevertheless, it receives the voltage reference $V_{ref}$, the negative-going pulse generated at the start of each switch period by one-shot 150, the Q and $\overline{Q}$ outputs of flip-flop 152, the output voltage $V_{02}$, and the switch disable input from transistor 500. From these inputs, it generates control signals I, J, K, L for the switches 26,28, as illustrated in FIGS. 1 and 2.

The inventive multi-voltage switching power supply thus generates an indefinite number of output voltages from relatively few components. It also alters its operating characteristics in the event of a no-load condition to prevent the output voltages from exceeding a fixed reference.

We claim:

1. A multi-output-voltage switching power supply comprising:
   a pair of fifty percent duty cycle switches connected in series with each other across a pair of incoming power lines, each of said switches having an internal shunting capacitance;
   first control means for alternately closing said fifty percent duty cycle switches, with each of said switches being closed for substantially the same time as the other;
   a plurality of pairs of first and second pulse-width modulated switches connected in series with each other across said incoming power lines, respectively, each of said switches having an internal shunting capacitance;
   respective power supply circuits connected from the junction between each pair of interconnected pulse-width modulated switches to the junction between said fifty percent duty cycle switches, each of said power supply circuits generating a DC output voltage that is a function of the closure times of its respective pulse-width modulated switches; and
   respective pulse-width modulated control means operating in synchronism with said first control means for closing said second pulse-width modulated switch in each pair for a portion of the time that said first fifty percent duty cycle switch is closed, and for closing said first pulse-width modulated switch for a portion of the time that said second fifty percent duty cycle switch is closed, the closure time of said pulse-width modulated switches being adjusted to maintain the DC output voltage at a predetermined value, whereby N DC output voltages can be generated from N+1 pairs of series-connected switches;
   comparator means for generating a no-load indicating signal in response to said output voltage exceeding a predetermined value; and
   gating means energized by said no-load indicating signal for altering the operation of said pulse-width modulated control means so that said pulse-width modulated switches operate in synchronism with said fifty percent duty cycle switches so that the voltage at the junction between the respective pairs of pulse-width modulated switches is always equal to the voltage at the junction between the fifty percent duty cycle switches, whereby the voltage applied to the power supply circuit connected therebetween is always zero.

2. The switching power supply of claim 1 wherein each of said power supply circuits comprise:
   a transformer having its primary connected between the junction of the pulse-width modulated switches in its respective pair and the junction of said fifty percent duty cycle switches;
   a full-wave rectifier connected to the secondary of said transformer; and
   a low-pass filter receiving the output of said full-wave rectifier.

3. The switching power supply of claim 1 wherein said pulse-width modulated control means comprises:
   current-sensing means for generating a current-indicating voltage in proportion to the current flowing from each output terminal of said power supply;
   first comparator means receiving the respective DC output voltage and a reference voltage, said first comparator means generating an output voltage error signal in proportion to the difference therebetween;
   second comparator means receiving said current-indicating voltage and said output voltage error signal, and generating a switch closure termination signal when said current-indicating voltage exceeds said output voltage error signal;
   a bi-stable circuit generating a switch closure signal in a first state, said bi-stable circuit being triggered to said first state at the same time that said fifty percent duty cycle switches change state and being triggered from said first state by said switch closure termination signal; and
   respective gate means closing each pulse-width modulated switch in an energized condition, the gate means for each pair of pulse-width modulated switches being alternately energized during the closure of the fifty percent duty cycle switch and the period of time that said bi-stable circuit is generating said switch closure signal.

4. The power supply of claim 3, further including third comparator means comparing said current-indicating voltage to a fixed reference voltage and generating said switch closure termination signal when said current-indicating voltage exceeds said fixed reference voltage, thereby limiting the maximum output current of said power supply.

5. The power supply of claim 3, further including a circuit for stabilizing the operation of said pulse-width modulated control means responsive to output current transients, said stabilizing circuit comprising means for generating a stabilizing signal having a magnitude that increases while said bi-stable circuit is in its first state, said stabilizing signal being added to said output voltage error signal, thereby effecting the turn-on time of said pulse-width modulated switches in response to output current transients to stabilize said power supply.

6. The power supply of claim 3, further including slow-start means for preventing the operation of said power supply on power-up of said power supply, comprising:
   third comparator means for comparing said reference voltage with a predetermined value, said third comparator means generating a disable signal when the reference voltage is less than said predetermined value; and
   means for disabling said gate means in response to said disable signal such that said pulse-width modulated switches are inhibited from closure until said reference voltage has reached said predetermined value.

7. The power supply of claim 6 wherein said reference voltage is determined by the charge in a capacitor, said capacitor being discharged upon the occurrence of at least one abnormal condition and being allowed to charge upon the termination of said abnormal condition so that said pulse-width modulated switches are disabled from operation during said abnormal condition and for a predetermined period thereafter.

8. The power supply of claim 7 wherein said capacitor is discharged by a comparator that generates a capacitor-discharging output when the voltage of power supplied to the components of said power supply falls below a predetermined value.

9. The power supply of claim 7 wherein said capacitor is discharged by a comparator that generates a capacitor-discharging output when the output current of said power supply exceeds a predetermined value.

10. The switching power supply of claim 1, further including blanking means for disabling said first control means and said pulse-width modulated control means for a relatively short period following the opening of each fifty percent duty cycle switch, thereby preventing the possibility of both series-connected, fifty percent duty cycle switches and pulse-width modulated switches from being closed at the same time.

11. A multi-voltage switching power supply comprising:
   first and second fifty percent duty cycle switches connected in series with each other across a pair of incoming power lines;
   a plurality of pairs of first and second pulse-width modulated switches connected in series with each other across said incoming lines, respectively;
   a transformer for each pair of series-connected, pulse-width modulated switches, the primary windings of respective transformers connecting the junction between each pair of pulse-width modulated switches to the junction between said fifty percent duty cycle switches;
   a power supply circuit connected to the secondary of each transformer, said power supply circuit generating a DC output voltage having a magnitude proportional to the absolute value of the current through said transformer;
   a voltage comparator for each power supply circuit, said voltage comparator receiving the DC output voltage from said power supply circuit and a reference voltage, said voltage comparator generating an output voltage error signal having a magnitude proportional to the difference therebetween;
   current-sensing means for each pair of series-connected, pulse-width modulated switches, said current-sensing means generating a current-indicating signal having a magnitude proportional to the current flowing through the primary of the transformer connected thereto;
   a pulse-width comparator for each pair of series-connected, pulse-width modulated switches, said pulse-width comparator receiving said output voltage error signal and said current-indicating signal, and generating a pulse-width termination signal when said current-indicating signal exceeds said output voltage;

an oscillator generating a constant-frequency clock signal;

first bi-stable means switching between first and second states in response to said clock signal, said bi-stable means closing said first fifty percent duty cycle switch and opening said second fifty percent duty cycle switch in said first state and opening said first fifty percent duty cycle switch and closing said second fifty percent duty cycle switch in the second state;

second bi-stable means for each pair of series-connected, pulse-width modulated switches, said second bi-stable means being switched to a first state as said first bi-stable means switches states, and being switched to a second state by said pulse-width termination signal, said second bi-stable means generating a switch closure signal in said first state; and first and second gate means enabled by said first bi-stable means, said first gate means being enabled when said first bi-stable means is in said second state and said second gate being enabled when said first bi-stable means is in said first state, said first and second gate means further receiving said switch closure signal from said second bi-stable means so that gate means generate respective switch-actuating signals when enabled upon receipt of said switch closure signal, the switch-actuating signal from said first gate means closing said first pulse-width modulated switch and the switch-actuating signal from said second gate means closing said second pulse-width modulated switch.

12. The switching power supply of claim 11, further including a current comparator for each of series-connected, pulse-width modulated switches, said current comparator switching said second bi-stable means to said second state when the current-indicating signal exceeds a predetermined value, thereby limiting the output current of said power supply.

13. The switching power supply of claim 11 wherein said switches are in parallel with an internal capacitance, said power supply further including, for each pair of series-connected, pulse-width modulated switches, means for preventing uncontrolled increases in output voltage in response to no-load conditions, comprising:

no-load comparator means for generating a no-load indicating signal in response to said output voltage exceeding said predetermined value; and third and fourth gate means enabled by said no-load indicating signal, said third gate means generating a switch-actuating signal when enabled while said first bi-stable means is in its first state, and said fourth gate means generating a switch-actuating signal when enabled while said first bi-stable means is in its second state, the switch-actuating signal from said third gate means closing said first pulse-width modulated switch and the switch-actuating signal from said fourth gate means closing said second pulse-width modulated switch so that the voltage at the junction between the respective pair of series-connected, pulse-width modulated switches is always equal to the voltage at the junction between the fifty percent duty cycle switches so that the voltage applied to the power supply circuit connected therebetween is always zero.

* * * * *